United States Patent
Quentin

(10) Patent No.: US 11,620,646 B2
(45) Date of Patent: Apr. 4, 2023

(54) METHOD FOR CARRYING OUT A TRANSACTION, TERMINAL, SERVER AND CORRESPONDING COMPUTER PROGRAM

(71) Applicant: Banks and Acquirers International Holding, Paris (FR)

(72) Inventor: Pierre Quentin, Enghien les Bains (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 170 days.

(21) Appl. No.: 16/415,422

(22) Filed: May 17, 2019

(65) Prior Publication Data

US 2019/0354973 A1 Nov. 21, 2019

(30) Foreign Application Priority Data

May 18, 2018 (FR) ..................................... 1854204

(51) Int. Cl.
*G06Q 20/38* (2012.01)
*G06Q 20/32* (2012.01)
*G06Q 20/40* (2012.01)

(52) U.S. Cl.
CPC ... *G06Q 20/38215* (2013.01); *G06Q 20/3226* (2013.01); *G06Q 20/3227* (2013.01);
(Continued)

(58) Field of Classification Search
None
See application file for complete search history.

(56) References Cited

U.S. PATENT DOCUMENTS

| 2002/0133467 A1 | 9/2002 | Hobson et al. |
| 2003/0182244 A1* | 9/2003 | Zucchetti ............. G06Q 20/403 705/75 |

(Continued)

FOREIGN PATENT DOCUMENTS

| EP | 3319031 A1 | 5/2018 |
| GB | 2508015 A | 5/2014 |

(Continued)

OTHER PUBLICATIONS

French Search Report and Written Opinion dated Oct. 17, 2018 for corresponding French Application No. 1854204, filed May 18, 2018.

(Continued)

*Primary Examiner* — Jamie R Kucab
(74) *Attorney, Agent, or Firm* — David D. Brush; Westman, Champlin & Koehler, P.A.

(57) ABSTRACT

A method for processing a transaction of a communications terminal, asking a server, through a communications network, for processing of a transaction involving the use of payment data. The method is implemented within the communications terminal. The method includes: transmitting a request for obtaining a certification code to the payment method whose data is used for the transaction; receiving the certification code coming from the payment method; inserting the certification code into a transaction data structure; transmitting the transaction data structure to the server; and when the certification code received by the server is valid, receiving a piece of data representing the validation of the transaction by the server.

16 Claims, 3 Drawing Sheets

(52) U.S. Cl.
CPC ..... *G06Q 20/3278* (2013.01); *G06Q 20/4018* (2013.01); *G06Q 20/4097* (2013.01); *G06Q 20/321* (2020.05); *G06Q 20/326* (2020.05)

(56) References Cited

U.S. PATENT DOCUMENTS

| | | | |
|---|---|---|---|
| 2014/0136350 A1 | 5/2014 | Savolainen | |
| 2015/0339659 A1* | 11/2015 | Ballesteros | G06Q 20/38215 |
| | | | 705/76 |
| 2016/0063480 A1* | 3/2016 | Ballesteros | G06Q 20/204 |
| | | | 705/17 |
| 2016/0300258 A1* | 10/2016 | Chao | G06Q 30/0225 |
| 2019/0272528 A1* | 9/2019 | Wu | G06Q 20/3274 |
| 2020/0193416 A1* | 6/2020 | Rule | G06Q 20/24 |
| 2020/0286068 A1* | 9/2020 | Fontaine | G06Q 20/3278 |

FOREIGN PATENT DOCUMENTS

| | | |
|---|---|---|
| WO | 2006100171 A1 | 9/2006 |
| WO | 2010070539 A1 | 6/2010 |
| WO | 2012053780 A1 | 4/2012 |
| WO | 2015158618 A1 | 10/2015 |
| WO | 2016122457 A1 | 8/2016 |

OTHER PUBLICATIONS

English translation of the Written Opinion dated Oct. 17, 2018 for corresponding French Application No. 1854204, filed May 18, 2018.

* cited by examiner

METHOD FOR CARRYING OUT A TRANSACTION, TERMINAL, SERVER AND CORRESPONDING COMPUTER PROGRAM

1. FIELD OF THE DISCLOSURE

The present disclosure relates to the securing of payments. More particularly, the invention relates to the securing of payments made by using a portable communications terminal such as a smartphone, a tablet or again a smart watch (or connected watch). Hereinafter, this type of payment is called a mobile payment. More specifically again, an exemplary object of the present technique is to increase the level of security of a transmission of data in the context of a mobile payment made with a portable communications terminal (for example a smartphone or a tablet) and a payment card.

2. PRIOR ART

In general, online payments, including mobile payments, represent on the one hand a particular type of payment and, on the other hand, a growing proportion of the payments made every day the world over. They can be made through a payment provider such as PayPal™ or by using traditional bank organizations through a payment bankcard.

However, online payment is marked by a relatively high rate of fraud. In France, it is estimated that about 5% of online payments made on the Internet are fraudulent. These fraudulent payments amounting to 5% represent about 33% of the total cost of fraud. Means are therefore needed, firstly to identify attempts at fraud and secondly to block these attempts.

One of the problems with mobile transactions is that they are done in "card not present" (CNP) mode. In this mode, since no device is responsible for verifying the integrity of the card (such as for example a payment terminal), it cannot be verified that the card holder has the PIN code needed to validate a transaction: the payment card is not used to carry out the transaction. Only the pieces of data recorded in the card are used. These pieces of data can be stolen for transactions by fraudulent individuals, possibly by using other merchant applications other mobile payments. Secondarily, the user's communications terminal (which includes all the data of the payment cards used by this user) can also be stolen, giving the thief access to all of user's data and enabling him to carry out fraudulent transactions.

Thus, in order to secure the transactions made in CNP mode, systems and methods have been proposed to resolve these problems of fraud. These methods pose problems of convenience for the user or other problems of security. This is for example the method described in the patent application WO2012053780. In this document, a system and a method of verification are described. More particularly, a method and a system using information on the MAC address of a customer terminal are described. During a transaction involving a payment, a process of authentication is implemented wherein the MAC address of the terminal used by the user wishing to make payment is compared with a reference MAC address, defined or obtained by the bank server which must authorize a payment or a transaction.

Although this method is potentially worthwhile, it is nevertheless impractical. Indeed, firstly this method requires that users should always use the same machine to make payment (unless several devices authorized to carry out a transaction are defined). On the other hand, there are many methods used to falsify a MAC address of a peripheral.

More particularly, the method described in WO2012053780 is based on the obtaining of a MAC address from a web browser. However, a pirate who wishes to obtain a user's MAC address will have no difficulty in obtaining this address when he enters the credit card data of the user in question, for example by using a method in which he positions himself before the merchant's server (or the server of the publisher of the application used for the payment). Thus, the method described in WO2012053780 does not seem to be very useful since the complementary information (the MAC address of the transactional device) would be as vulnerable as the others. The method described would therefore have little likelihood of making the transaction truly secure.

Other methods are also available. Certain methods involve the supply to the user of unique bankcard numbers. These numbers are given according to the customer's needs. This method is worthwhile but does not eliminate the possibility for the user of using his own card information to make transactions. Other methods, now widely used, consist in transmitting an SMS type message to the customer making a transaction to ensure that he is the card-holder. At the time of the transaction, the user must enter a password transmitted by SMS. The bank therefore makes sure, with reasonable probability, that the person who has made the transaction is the user.

This method has two drawbacks. Firstly, it obliges the user to give the bank his telephone number before any transaction, and to do so in a secured manner; secondly this method works only if the customer's bank is also the bank managing the transaction on behalf of the merchant: this is not necessarily the case, especially abroad which is precisely where the greatest proportion of fraud is carried out. Thus, the above-mentioned method is not very efficient in this case.

3. SUMMARY

In an exemplary embodiment, the method proposed by the inventors does not pose these prior-art problems. Indeed, a method is proposed for locating a user making a mobile payment.

More particularly, an exemplary embodiment of the invention relates to a method for carrying out a transaction of a communications terminal requesting a server, through a communications network, for acceptance of a transaction involving the use of payment data (in CNP mode), this payment data coming from a payment means. According to an exemplary embodiment of the invention, this method comprises:

a step for sending a request for obtaining a certification code to the payment means whose data is used for the transaction;

a step for receiving said certification code from said payment means;

a step for inserting said certification code into a transaction data structure;

a step for transmitting the transaction data structure to said server; and when the certification code received by said server is valid, a step for receiving a piece of data representing the validation of the transaction by said server.

Thus, an exemplary embodiment of the invention enables the validation of a transaction (such as a mobile payment) on the basis of a specific code, the certification code, which is obtained from the payment means whose data is used to enable the performance of the mobile payment.

According to one particular embodiment, said method further comprises:
- a preliminary step for determining a value of a certification parameter, said certification parameter being linked to said transaction; and
- a step for inserting the value of the certification parameter into the request for obtaining a certification code.

Thus, the certification code depends on a value that is not necessarily linked to the payment means itself, thus increasing the security of this certification code.

According to one particular characteristic, the certification parameter belongs to the group comprising:
- a parameter of a function for creating said certification code;
- a value representing a merchant's identifier;
- a value representing a communications terminal identifier;
- a value representing the transaction;
- a value representing a date and/or time of the transaction.

Thus, the certification code is created uniquely for the transaction in progress. The certification code therefore cannot be re-used a second time (replayed) in another transaction that would be performed by a fraudulent individual.

According to another particular characteristic, said step of insertion of said certification code within a transaction data structure comprises a step of selection, from among a plurality of available fields, of an existing specific field.

Thus, rather than adding a field dedicated to the reception of the certification code, the technique enables the selection, from within available fields, of a specific field, possibly a random field, within which the certification code is inserted.

According to one particular embodiment, the specific field is the field dedicated to the reception of the card verification value (CVV).

Thus, instead of using the (static) card verification value (CVV) to be able to validate the fact that the possessor of the payment means truly knows the totality of the data attached thereto, the inventors propose to replace this code by the certification code (which is dynamic and therefore more secured) and to do so without its being necessary to modify the data structure transmitted via the communications network.

According to one particular embodiment, the certification parameter includes a piece of data representing an identifier of said communications terminal and a piece of data representing a time of the transaction.

According to one particular embodiment, the certification code represents an operation of encryption carried out by said payment means, said operation of encryption being done by means of an NFC type communication between said communications terminal of the user and said payment means.

According to another aspect, an exemplary embodiment of the invention also relates to a processing server for processing a transaction, taking the form of an electronic device connected to a communications network, said server comprising means for receiving data coming from a communications terminal. Such a server comprises:
- means for receiving a transactional request, comprising at least one piece of data representing a payment to be made through said communications terminal and a certification code;
- means for obtaining a piece of certification code verification data from the payment means used for the transaction;
- means for determining a current certification code associated with the data received within the transactional request;
- means for comparing certification codes with one another;
- means for providing a third-party entity with a transaction authorization when said comparison is positive.

According to another aspect, an exemplary embodiment of the invention also relates to a communications terminal comprising transaction processing means and means for asking a server, through a communications network, for the processing of a transaction involving the use of payment data, the communications terminal comprising:
- means for sending a request for obtaining a certification code to the payment means whose data are used for the transaction;
- means for receiving said certification code from said payment means;
- means for inserting said certification code into a transaction data structure;
- means for transmitting the transaction data structure to said server;
- and means for receiving a piece of data representing the validation of the transaction by said server.

According to exemplary embodiments, the different steps of the method are carried out by one or more software programs or computer programs comprising software instructions that are to be executed by a data processor of a relay module according to an exemplary embodiment of the invention, these programs being designed to control the execution of the different steps of the methods.

An exemplary embodiment of the invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

An exemplary embodiment of the invention is also aimed at providing an information carrier or medium, readable by a data processor and comprising instructions of a program as mentioned here above.

The information medium can be any entity or communications terminal whatsoever capable of storing the program. For example, the medium can comprise a storage means such as a ROM, for example a CD ROM or microelectronic circuit ROM or again a magnetic recording means, for example a mobile carrier (a memory card) or a hard disk drive.

Besides, the information carrier can be a transmissible carrier such as an electrical of optical signal that can be conveyed by an element or optical cable, by radio or by other means. The program according to an exemplary embodiment of the invention can especially be uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc.) and is capable of accessing the hardware resources of this physical entity (memories, recording media, communications buses, input/output electronic boards, user interfaces etc.).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of firmware etc.

Each component of the system described here above can of course implement its own software components.

The different embodiments mentioned here above can be combined with one another to implement the proposed technique.

4. FIGURES

Other features and advantages of one or more exemplary embodiments of the invention shall appear more clearly from the following description of a preferred embodiment, given by way of a simple illustrative and non-exhaustive example and from the appended drawings, of which:

FIG. 1 describes one embodiment of the method of carrying out a transaction;

FIG. 2 describes one embodiment derived from the method for carrying out a transaction;

5. DESCRIPTION OF ONE EMBODIMENT

Figure 1:
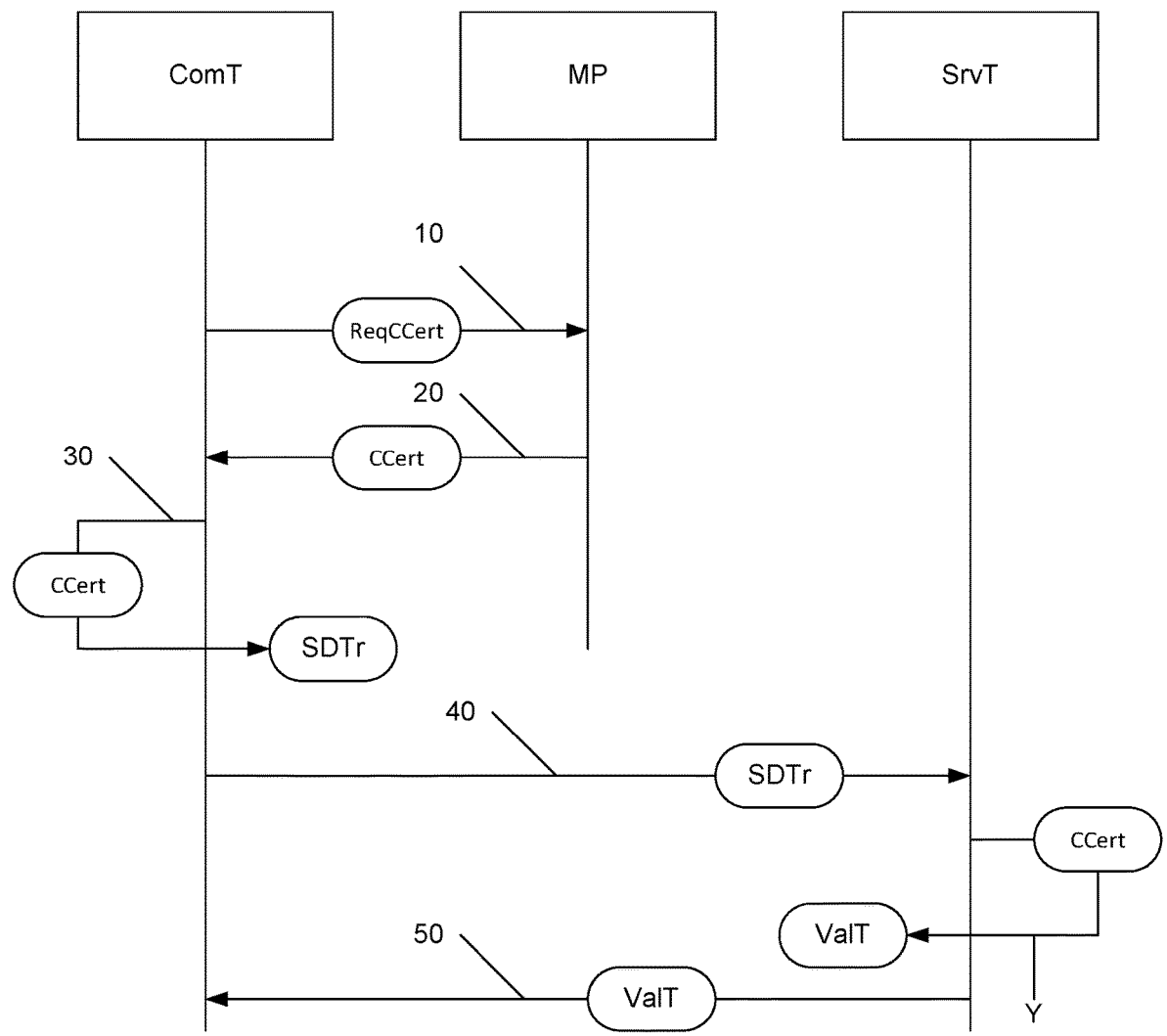

5.1. Reminder of the Principle of an Exemplary Embodiment of the Invention

As explained here above, it has been observed that present-day solutions do not necessarily make it possible to be sure that the mobile payment made is coming from the holder of the payment means (a payment card for example), the data of which are being used. The object of the proposed method is to see it that, during the use of data of the payment means in CNP mode (i.e. when entering the payment data into an entry form or when using the payment data in their textual form to create a transaction), in the context of mobile payment, it should be possible all the same to obtain certification of the presence of the payment means. In short, the goal is to pass from a CNP mode (textual use of payment data) to a mode where the presence of the payment means is verified without fundamentally changing the user's habits and to do so with total discretion.

To this end, the steps leading to the validation of the transaction are modified. In at least one embodiment of the proposed method, we obtain, in addition to (or instead of) data of the payment card (name, number, date, card verification value CVV)), a piece of data transmitted independently and additionally by the payment means themselves. In one basic mode, this piece of data transmitted by the payment means consists of a digital signature of certain pieces of data that are recorded therein.

Thus, the general principle of the present technique relies on the implementing of a communications terminal comprising means (such as for example a processor or a circuit comprising a microprocessor) for obtaining data coming from a payment means (it being understood that this is for example a payment card and/or another communications device comprising a payment function). More specifically, in at least one embodiment, a means for obtaining data coming from a payment means takes the form of a contactless communications module, such a module being more specifically a near-field communications module (NFC). This module receives, from a processor of the communications terminal, an instruction or a command for obtaining contactless data. It may be a general command. Besides, this module is connected to a contactless antenna. This contactless antenna serves to send out a signal to the payment means and to receive a signal coming from this payment means. To this end, an exemplary embodiment of the invention implements for example an application installed within the communications terminal and comprising means to detect data-entry fields of payment means.

A contactless payment means takes for example the form of a payment card (or credit card or debit card), comprising an NFC (near-field communications) type antenna, this antenna comprising means for transmitting data to a receiver when it receives a request to this effect from this receiver (the request taking for example the form of an electromagnetic signal). The antenna, called a contactless antenna, can be connected to a processor. The processor can for example be the chip of the smartcard or an additional processor buried in the substrate of the card (just like the antenna). Secondarily, a contactless payment means can also take the form of a communications terminal (a second communications terminal) provided with contactless data transmission means and possibly an application specifically intended for the transmission of data equivalent or identical to payment card data. Such an application can for example be a bank application installed in the communications terminal that preserves this data in the secured manner. In this case, for example, the technique is implemented by placing this second communications terminal on the first communications terminal. It is quite possible to envisage such an implementation since many people have both a tablet and a smartphone, the smartphone having a "bank" application for example installed within a trusted environment while the tablet is used more widely and more freely by several people in a home, and is not meant to contain confidential data.

One example of general use is the following:
using a "merchant" application installed on the communications terminal (an application specific to a merchant, or generic "browser" type application), the user wishes to purchase a product or a service;
when he validates his command, the user must provide data enabling payment (name, number, data, CVV): this data is for example entered by the user himself (in an entry field provided for this purpose) or again it is "automatically" entered by a payment application (for example Google Pay™, Samsung Pay™, ApplePay™, these applications providing secured "sub-hosting" for payment data given by the user, or again for a bank application;
a specific applications module, integrated into or separate from any payment application used, detects the need for payment and asks the user to place his (contactless) payment needs in proximity to the corresponding contactless interface of the communications terminal (generally situated on the back of the communications terminal);

the method for securing the present technique is then implemented on the basis of a dialog (described here below) between the payment means (MP) and the communications terminal (ComT) and a transactional sever (SrvT): a first step of this method leads to obtaining a particular piece of data given by the payment means, this piece of data being called a certification code; the certification code obtained from the user's payment means is used in a second step of the method to certify that the transaction is being conducted by the user with the payment means "in hand" and not only with the data of the payment means (for example the data recorded on the payment card).

This method of securing described with reference to FIG. 1 comprises:
 a step for sending (10) a request for obtaining a certification code (ReqCCert) to the payment means whose data have been used for the transaction;
 a step for receiving (20) said certification code (CCert) from said payment means;
 a step for inserting (30) said certification code (CCert) into a transaction data structure (SDTr);
 a step for transmitting (40) the transaction data structure (SDTr) to said server;
 and when the certification code received by said server is valid, a step for receiving (50) a piece of data representing the validation (ValT) of the transaction by said server.

The pieces of data used for the transaction therefore comprise, in addition to the usual data (name, number, date of validity), a piece of complementary data (certification code) coming directly from the payment means itself. These data are transmitted by means of the usual interfaces to the server (SrvT) in charge of processing the transaction. The processing of the transaction comprises a complementary phase for verifying that the certification code received is compliant with the awaited certification code. Thus, this verification is done by the server that possesses the cryptographic data needed to verify the signature. As a rule, therefore, this is the bank server that has provided the data used by the payment means (hence more generally the user's bank server). However, the payment service provider (the bank) can delegate these operations for validating transactions to trusted third parties and can thus authorize another server (another entity) to perform these operations in its place.

Figure 2:
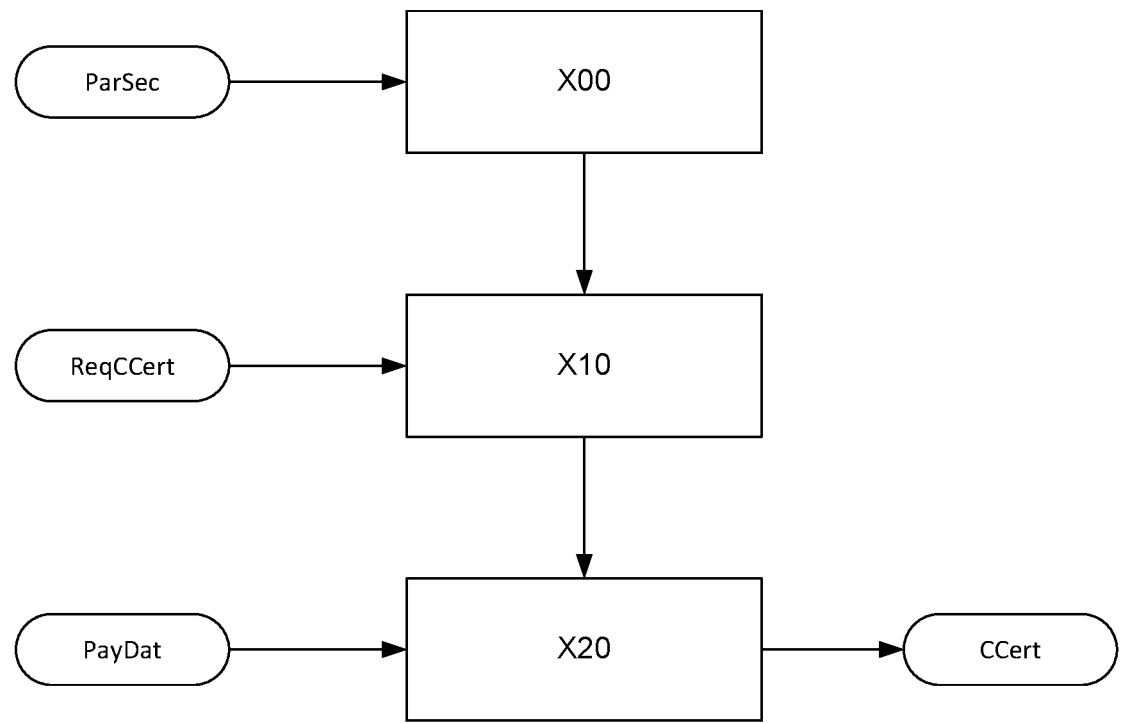

One particular embodiment of the creation of the certification code is implemented by the payment means as explained with reference to FIG. 2. The payment means receive (X10) a request from the communications terminal for setting up a certification code. The transmission of this request follows a first exchange (X00) (a handshake) between the communications terminal and the payment means, a handshake during which transaction securing parameters (ParSec) can be exchanged. Upon reception of the request for setting up a certification code, the payment means use one or more pieces of data of the payment means (PayDat) to generate (X20) a certification code that is secured by the use of a secret held at least (or even at most) by the payment means itself. The certification code is then transmitted to the communications terminal so that it can add it to the data transmitted to the server (by means of a communications network) to which the communications terminal is connected. Thus, the establishment of the certification code is carried out as a function of at least one piece of payment data.

The certification code can be generated by the payment means itself in several different ways. For example, the payment means can generate a payment data digital signature (name, number, date, CVV) and transmit this signature to the communications terminal. The data are signed for example by means of a private key of the card. The data (name N1, number N2, date D, cryptogram C) are for example concatenated (N1|N2|D|C) to form a string of characters CC to which a cryptographic operation is applied by using the private key (KPriv) of the payment means. This private key (KPriv) is held only by the payment means.

In another embodiment, the certification code is not the unique piece of data enabling validation of the transaction. In this embodiment, the piece of data validating or not validating the transaction is an encoded identifier of the user's communications terminal, an identifier that is "encoded" by the payment means to produce a certification code of the communications terminal. The certification code of the communications terminal from which the transaction is carried out is thus obtained through an operation carried out by the payment means (contactless payment means). This certification code of the communications terminal becomes the piece of information enabling the authorization of transaction (i.e. validation that a transaction can be performed) to be issued. This embodiment presents several advantages. First of all, this embodiment overcomes problems of retrieval of the transaction amount (an amount that is not necessarily available in the terminal itself). Secondly, such an implementation enables the server (the bank server), upon reception of the certification code from the communications terminal, to decrypt it by means of a public key of the payment means and to verify that the identifier of the communications terminal corresponds to an identifier "authorized" by the server (bank server or transaction server), which enables the addition of an additional securing level. In general, the communications terminal can parametrize the certification code (and therefore use a certification parameter that it transmits to the payment means), in order to make this payment means unique (i.e. not usable a second time). More particularly, among the certification parameters used to confer uniqueness to the certification code, we can cite:
 a parameter of a function of creation of said certification code: this parameter makes it possible for example to determine the order of concatenation of the bank data or again this parameter can provide a function of association of the bank data;
 a value representing a merchant's identifier: this value can be provided by the merchant or by the publisher of the application on which the payment is initiated;
 a value representing a communications terminal identifier: as explained here above, this value can for example represent a SIM card identifier or an USIM card identifier;
 a value representing the transaction, such as for example the amount of this transaction;
 a value representing a date and/or time of the transaction,
 a random value, enabling the creation of the certification code as a function of a parameter given by the communications terminal itself or by the transaction server; in this case, the random number is transmitted by the transaction server to the communications terminal in order to enable the subsequent comparison of the certification code and prevent replay.

a combination of the parameters mentioned here above, depending on the embodiments.

Thus, the certification code is established as a function of at least one piece of data of the payment means and/or a piece of data of the communications terminal. This parameter or these parameters can be generated with an additional exchange with the transactional server so that it can have the parameter or parameters used to generate the certification code and thereafter to verify it. Advantageously again, the parameter or parameters are all or partly derived from a preliminary exchange (handshake) that takes place between the communications terminal and the transactional server. This handshake makes it possible to determine modalities of exchange between the communications terminal and the server. It delivers secured data (such as session keys for example). From the session keys, certain of the above parameters can be derived (random value, function of creation of the certification code, etc.). The advantage is that of ensuring that it is impossible to replay the certification code for another transaction.

The certification code created by the main payment means used to create the transaction (payment card, second communications terminal), is inserted by the communications terminal into a transaction data structure. The insertion is preceded by a step of selection, from among a plurality of available fields, of an existing specific field. It is thus possible to envisage making this selection a random selection, as needed. According to another characteristic, the specific field within which the certification code is inserted is the field dedicated to the reception of the card verification value (CVV). Thus, instead of requesting the entry of this code by the user (an entry which may pose a problem especially in certain sites that are not very scrupulous about data security), this field is used for the insertion therein of the certification code. In other embodiments, the certification code is transmitted at the same time as the "token" representing the identification of the bank data of the user making the payment. It may be recalled that "tokenization" consists in replacing a piece of data by another piece of data without there being any relationship between the two pieces of data. The "token" is used in place of the sensitive data (for example the PAN number of the bank card), and it is therefore this token that is exposed to threats and not the sensitive data (hence not the PAN). At the same time, a base is set up to store the relationships between the data and their corresponding tokens, a base that is called a "tokenizing base". In the example of the use of a "token", this token is recorded within the communications terminal, for example by means of the mechanisms described in the following embodiment.

Here below, we present an implementation of the principle explained here above. This implementation is in no way restrictive and any other implementation comprising the same characteristics as those explained can be envisaged. It is clear that all the characteristics and embodiments described in the present invention can be combined with one another without its being necessary to describe all the possible combinations.

5.2. Description of One Embodiment

This embodiment uses a certification code obtained during payment by means of the communications terminal from which the transaction is made, this code being produced by the user's contactless payment card. To produce this certification code, the user is asked to place his contactless payment card on (bring it closer to) the back of his communications terminal.

The communications terminal for its part comprises a secure element (SE) and a trusted execution environment (TEE) that comprises a specific application of the "Contactless Registry Event Listener" (CREL) type or its equivalent depending on the environment. Thus, in this embodiment, the communications terminal is deemed to be hosting, at least through the secure element (SE) (or a TEE and/or USIM, SIM, UICC), at least one "low level" application in charge of the management of the payment data (activation/deactivation of payment cards). The secure element has a communications interface with a contactless communications controller that is linked by cable with the contactless antenna of the communications terminal. In this embodiment, an interrogating application (APPINT) is implemented within the secure element. This interrogation application is called a payment application of the open operating system (Android™, iOS™, etc.). The payment application manages the processing through the low-level application of the data needed for the processing of a payment transaction (for example, insertion of the data "name", "number", "date", "CVV" in the fields planned for this effect). At the same time or in succession, the payment application makes a request to the interrogation application, to obtain a certification code. To request this code in turn, the interrogation application can have available predefined parameters or it can be provided with parameters by the payment application.

After notification of the payment application, the contactless payment card is placed by the user in proximity with the contactless antenna. The interrogation application asks to obtain the certification code by transmitting an appropriate command to the payment card, which carries out the requested operation, as a function of the parameters that are transferred in the request for obtaining the certification code. In this embodiment, two parameters are used: a value representing the identifier of the terminal and a value representing the time of the transaction. These two representative values are for example concatenated and transmitted to the payment card in the request for obtaining the certification code. The representative values can for example be a hash of the original value or again a contraction of this original value or again an extraction of a part of it. It can also be the original value as such. This is determined as a function of the size of data available for setting the parameters in the request for obtaining the certification code.

The payment card then computes the certification code as a function of the parameter or parameters transmitted and renders the certification code to the communications terminal. more particularly, the contactless communications terminal receives and transmits, for example through an HCI (host controller interface), the certification code to the interrogation application which, depending on the operational implementations, itself, transmits this certification code to the payment application (or else to the merchant's application). The certification code is then inserted into the transaction data structure which is transmitted on the communications network up to the server or else again inserted into an "http" type response (for example by means of secured AJAX services), addressed to the merchant's (on-line) server or the (merchant's) bank server.

As already indicated here above, the terminal from which the transaction is made is not a payment terminal (understood as a terminal in which the bank card is inserted and in which a PIN code is entered). It is a terminal such as a tablet or a smartphone and not a payment terminal such as those installed in a merchant's premises.

Thus, in this embodiment, the method implemented comprises the following in the communications terminal:
- a step for transmitting, to payment means whose data are used for the transaction a request to obtain a certification code;
- a step for receiving said certification code from said payment means;
- a step for inserting said certification code into a transaction data structure;
- a step for transmitting the transaction data structure to said server; and
- when the certification code received by said server is valid, a step for receiving a piece of data representing the validation of the transaction by said server.

When the certification code corresponds to at least one expected certification code, a step for issuing a piece of data representing a validation of transaction to an entity.

The data representing a validation of transaction can then be provided to validate the bank transaction (this validation of bank transaction is of course carried out in taking into account the other parameters and values entering into the validation process) with another entity (such as for example a bank server when the transaction is itself processed by a transactional server).

Thus, the method enables a comparison of the certification code produced by the payment means (the NFC payment card) with an expected certification. The format of the expected certification code can be defined by the user's bank automatically or statically. For a static definition, the types and the nature of the parameters are determined in advance during the encoding of the low-level interrogation application (for example). For a dynamic definition, these parameters are the object of exchanges between the user's communications terminal and the appropriate server (transactional server or bank server).

5.3. Transactional Server

Figure 3:
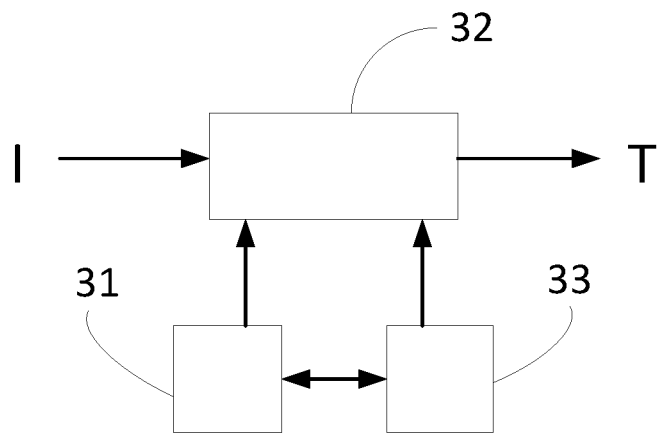
FIG. 3 illustrates an architecture of the server capable of implementing a method for carrying out a transaction.

In at least one embodiment, the method described is implemented by means of a transactional server presented with reference to FIG. 3. Such a server can, as required, be implemented by a bank organization, a payment service provider or a service provider serving as an intermediary between one or more bank establishments or payment establishments.

Such a management server comprises a memory 31, a processing unit 32 equipped for example with a microprocessor and driven by the computer program 33, implementing the method according to an exemplary embodiment of the invention. In at least one embodiment, the invention is implemented in the form of a bank server of a payment system. Such a server comprises:
- means for receiving a transactional request, coming at least partially from the communications terminal, comprising at least one payment data identifier (a token) and/or the bank data itself, all accompanied by a certification code; these means can take the form of a connection interface (I) for connection to one or more communications networks. They may be software interfaces or hardware interfaces (of the network card type or network communications hardware modules).
- means for obtaining a piece of data for verifying the certification code by means of the payment means used for the transaction. These means can take the form of a connection interface (I) for connection with several communications networks. These may be software or hardware interfaces (such as a network card or network communications hardware modules). They can also take the form of a tokenizing data base when this technique is used to make payment.
- means for determining a current certification code associated with the data received within the transactional request: they may for example be means for computing a current certification code from received data: in the event of reception of a token, the bank data associated with this token are retrieved and, from these data and from the known parameters, the certification code is computed;
- means for comparing certification codes with one another, as a function of the bank data known to the user;
- means for supplying an entity (bank server for example) with a transaction authorization when said comparison is positive. These means can take the form of a connection interface for connection with one or more communications networks. They may be software or hardware interfaces (such as a network card or network communications hardware modules).

In at least one embodiment, such a server also comprises means for obtaining at least one piece of information coming from a communications terminal that is assumed to be in the possession of the user for whom it is sought to validate a transaction. In this embodiment, this server can for example transmit a request for obtaining this piece of information to the communications terminal. To this end, it can implement several techniques, the first being for example the transmission of an SMS type message to an application installed in the terminal (c.f. Communications Application and Terminal) in order to validate the transaction relative to a known and authorized communications terminal identifier.

When it is possible, the certification code is derived from a computation made with the private key of the payment means (for example a private key of the contactless card) and the data of this encrypted certification code are decrypted by means of the public key of the card in the possession of the bank server and/or of the transaction server that implements the present technique. Hence, when the server decrypts the certification code received from the mobile terminal, able to verify that the data obtained by this description truly corresponds to the expected data.

5.4. Device for Implementing an Exemplary Embodiment of the Invention

Figure 4:
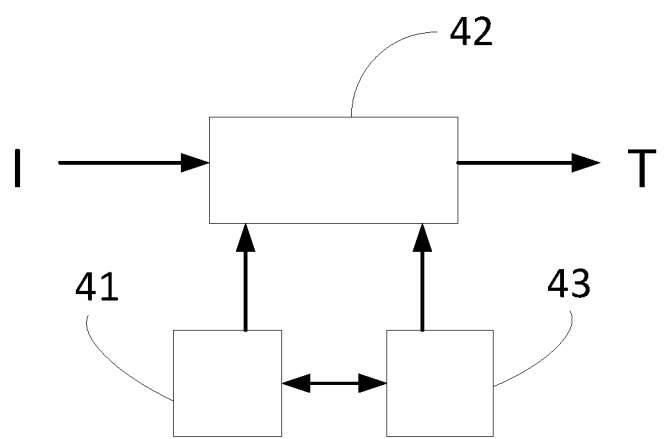
FIG. 4 illustrates an architecture of a customer device capable of implementing a method for carrying out a transaction.

Referring to FIG. 4, we present a simplified architecture of a mobile device capable of transmitting its position. Such a mobile device comprises a memory 41, a processing unit 42 equipped for example with a microprocessor and controlled by the computer program 43, implementing the method according to an exemplary embodiment of the invention. In at least one embodiment, the invention is implemented in the form of a mobile application installed on a mobile device in the user's possession. Such a mobile device comprises:
- means for sending a request for obtaining a certification code to the payment means whose data are used for the transaction;
- means for receiving said certification code from said payment means;
- means for inserting said certification code into a transaction data structure;
- means for transmitting the transaction data structure to said server; and means for receiving a piece of data representing the validation of the transaction by said server.

These means take the form of a specific software application, or again the form of dedicated hardware components such as a secure element (SE) or a trusted execution environment. The secure element can take the form of a SIM card, a USIM or UICC card or again a specific security component grafted onto the motherboard of the communications terminal. More particularly, in at least one embodiment, these means take the form of several hardware components to which several software components are adjoined. More particularly, the means for sending the request for obtaining the certification code are included in a secure component that comprises varyingly direct access to a transmission/reception controller of a near field (NFC) type electromagnetic field enabling the direct interrogation of an NFC compatible payment means. The secure component is in charge of at least partially determining a parameter for computing a certification code. The other components of the communications terminal are the object of a description related to the proposed embodiment.

Although the present disclosure has been described with reference to one or more examples, workers skilled in the art will recognize that changes may be made in form and detail without departing from the scope of the disclosure and/or the appended claims.

The invention claimed is:

1. A method for processing a transaction between a communications terminal of a user and a server through a communications network, wherein the transaction is a payment transaction involving use of payment data provided by the user's communications terminal during execution of the transaction, wherein the method comprises the following acts performed by the communications terminal of the user:
   transmitting a request for obtaining a certification code from the user's communications terminal to a payment device of the user;
   after transmitting the request for obtaining the aforementioned certification code, receiving, from the payment device, the aforementioned certification code;
   inserting said certification code into a transaction data structure of the user's communications terminal;
   transmitting the transaction data structure from the user's communications terminal to said server; and
   receiving a piece of data representing validation of the transaction by said server, indicating the certification code transmitted to the server compares positively with an expected certification code;
wherein the method further comprises the following acts performed by the payment device:
   recording the payment data that is used for the transaction;
   generating the certification code as a function of at least one piece of data of said payment device and at least one piece of data of the user's communications terminal transmitted in the request;
and wherein the payment device is distinct from the user's communications terminal.

2. The method for processing a transaction according to claim 1, wherein the method further comprises:
   a preliminary act of the user's communications terminal determining a value of a certification parameter, said certification parameter being linked to said transaction; and
   inserting the value of the certification parameter into the request for obtaining a certification code.

3. The method for processing a transaction according to claim 2, wherein the certification parameter belongs to the group consisting of:
   a parameter of a function for creating said certification code;
   a value representing a merchant's identifier;
   a value representing a communications terminal identifier;
   a value representing the transaction;
   a value representing a date and/or time of the transaction.

4. The method for processing a transaction according to claim 1, wherein inserting said certification code within a transaction data structure comprises a selection, from among a plurality of available fields, of an existing specific field.

5. The method for processing a transaction according to claim 4, wherein the specific field is the field dedicated to reception of a card verification value.

6. The method for processing a transaction according to claim 2, wherein the certification parameter comprises a piece of data representing an identifier of said communications terminal and a piece of data representing an actual time of the transaction.

7. The method for processing a transaction according to claim 1, wherein the certification code represents a result of an encryption operation carried out by said payment device, said encryption operation being performed by using the user's communications terminal and an encryption key held by said payment device, said certification code being received by the user's communications terminal over an NFC-type communication after the encryption operation.

8. The method for processing a transaction according to claim 1, wherein the user's communications terminal transmits the request to the payment device and receives the certification code from the payment device by near field communication (NFC) using an NFC antenna.

9. The method for processing a transaction according to claim 1, wherein the data structure in which the certification code is inserted further comprises the payment data associated with the payment device.

10. The method for processing a transaction according to claim 1, wherein the payment device is a payment card.

11. The method for processing a transaction according to claim 1, wherein the payment device is another communications terminal.

12. A processing server for processing a transaction, wherein the transaction is a payment transaction involving use of payment data provided by a user's communications terminal during execution of the transaction, the processing server taking the form of an electronic device connected to a communications network, said processing server comprising:
   a processor; and
   a non-transitory computer-readable medium comprising instructions stored thereon, which when executed by the processor configure the processing server to perform acts comprising:
   receiving a transactional request from the user's communications terminal, comprising at least one piece of data representing a payment to be made through said user's communications terminal and a certification code, said certification code being a function of at least one piece of data of the payment device and at least one piece of data of the user's communications terminal, the payment device of the user being distinct from the user's communications terminal;

obtaining a piece of verification data for verifying the certification code generated by the payment device used for the transaction;

determining a current certification code associated with the at least one piece of data representing a payment to be made through said user's communications terminal received within the aforementioned transactional request;

comparing certification code received with the transactional request with the current certification code; and providing a third-party entity with a transaction authorization when said comparison is positive.

13. A user's communications terminal comprising:

a processor; and a non-transitory computer-readable medium comprising instructions stored thereon, which when executed by the processor configure the user's communications terminal to process a transaction between the user's communications terminal and a server through a communications network, wherein the transaction is a payment transaction involving use of payment data provided by the user's communications terminal during execution of the transaction, by performing acts comprising:

processing the transaction;

transmitting a request for obtaining a certification code from the user's communications terminal to a payment device of the user on which is recorded the payment data that is used for the transaction, the payment device being distinct from the user's communications terminal;

after transmitting the request for obtaining the aforementioned certification code, receiving, from said payment device, the aforementioned certification code, which is a function of at least one piece of data of said payment device and at least one piece of data of the user's communications terminal transmitted in the request;

inserting said certification code into a transaction data structure of the user's communication terminal;

transmitting the transaction data structure from the user's communications terminal to said server; and receiving a piece of data representing validation of the transaction by said server, indicating the certification code transmitted to the server compares positively with an expected certification code.

14. A non-transitory computer-readable medium comprising program code instructions stored thereon for executing a method for processing a transaction between a communications terminal of a user and a server through a communications network, when the instructions are executed by a processor of the communications terminal, wherein the transaction is a payment transaction involving use of payment data provided by the communications terminal during execution of the transaction, wherein the instructions configure the processor to:

transmit a request for obtaining a certification code from the user's communications terminal to a payment device of the user on which is recorded the payment data that is used for the transaction, the payment device being distinct from the user's communications terminal;

after the transmission of the request for obtaining the aforementioned certification code, receive, from the payment device, the aforementioned certification code, said certification code being a function of at least one piece of data of said payment device and at least one piece of data of the user's communications terminal transmitted in the request;

inserting said certification code into a transaction data structure of the user's communications terminal;

transmitting the transaction data structure from the user's communications terminal to said server; and receiving a piece of data representing validation of the transaction by said server, indicating the certification code transmitted to the server compares positively with an expected certification code.

15. A payment device comprising:

a processor; and a non-transitory computer-readable medium comprising instructions stored thereon, which when executed by the processor configure the payment device to process a transaction between a user's communications terminal and a server through a communications network, wherein the transaction is a payment transaction involving use of payment data provided by the user's communications terminal during execution of the transaction, by performing acts comprising:

receiving, from the user's communications terminal, a request for obtaining a certification code;

recording the payment data that is used for the transaction;

generating the certification code as a function of at least one piece of data of said payment device and at least one piece of data of the user's communications terminal transmitted in the request;

transmitting the aforementioned certification code to the payment device;

performing the transaction when a comparison of the certification code transmitted to the server by the user's communications terminal with an expected certification code is positive, said transmission of the certification code to the server by the user's communications terminal comprising insertion of said certification code into a transaction data structure of the user's communications terminal;

wherein the payment device is distinct from the user's communications terminal.

16. A non-transitory computer-readable medium comprising program code instructions stored thereon for executing a method for processing a transaction between a communications terminal of a user and a server through a communications network, when the instructions are executed by a processor of a payment device, wherein the transaction is a payment transaction involving use of payment data provided by the communications terminal during execution of the transaction, wherein the instructions configure the processor to:

receive, from the user's communications terminal, a request for obtaining a certification code;

record the payment data that is used for the transaction;

generate the certification code as a function of at least one piece of data of said payment device and at least one piece of data of the user's communications terminal transmitted in the request;

transmitting the aforementioned certification code to the payment device;

performing the transaction when a comparison of the certification code transmitted to the server by the user's communications terminal with an expected certification code is positive, said transmission of the certification code to the server by the user's communications terminal comprising insertion of said certification code into a transaction data structure of the user's communications terminal;

wherein the payment device is distinct from the user's communications terminal.

* * * * *